(12) United States Patent
Dent et al.

(10) Patent No.: US 6,597,842 B2
(45) Date of Patent: Jul. 22, 2003

(54) OPTICAL INTERLEAVER WITH IMAGE TRANSFER ELEMENT

(75) Inventors: Jyl Ren Dent, Rolling Heights, CA (US); Amado Cordova, Venice, CA (US); Ronald J. Michal, Wrightwood, CA (US); Chin L. Chang, Walnut, CA (US); Trong-Huang Lee, Walnut, CA (US)

(73) Assignee: Copley Networks, Inc., City of Industry, CA (US)

( * ) Notice: Subject to any disclaimer, the term of this patent is extended or adjusted under 35 U.S.C. 154(b) by 37 days.

(21) Appl. No.: 09/862,146

(22) Filed: May 21, 2001

(65) Prior Publication Data

US 2002/0181872 A1 Dec. 5, 2002

(51) Int. Cl.[7] .............................. G02B 6/42; H04J 14/02
(52) U.S. Cl. .............................. 385/39; 385/24; 385/33; 385/42; 359/124; 359/127; 359/131
(58) Field of Search .............................. 385/24, 39, 74, 385/33, 34, 35, 42; 359/124, 127, 131

(56) References Cited

U.S. PATENT DOCUMENTS

| | | | | |
|---|---|---|---|---|
| 6,031,948 A | * | 2/2000 | Chen | 385/24 |
| 6,169,626 B1 | * | 1/2001 | Chen et al. | 359/279 |
| 6,185,345 B1 | * | 2/2001 | Singh et al. | 385/24 |
| 6,212,313 B1 | * | 4/2001 | Li | 385/24 |
| 6,222,958 B1 | * | 4/2001 | Paiam | 385/24 |
| 6,256,433 B1 | * | 7/2001 | Luo et al. | 385/24 |
| 6,268,951 B1 | * | 7/2001 | Chen et al. | 359/279 |
| 6,339,474 B2 | * | 1/2002 | Paiam et al. | 356/480 |
| 6,366,390 B1 | * | 4/2002 | King et al. | 359/264 |
| 6,525,848 B2 | * | 2/2003 | Cao | 359/107 |
| 2002/0054294 A1 | * | 5/2002 | Ahamadvand et al. | |
| 2002/0145781 A1 | * | 10/2002 | Spock et al. | |
| 2002/0181830 A1 | * | 12/2002 | Dent et al. | |
| 2002/0181872 A1 | * | 12/2002 | Dent et al. | |

* cited by examiner

Primary Examiner—Brian Healy
(74) Attorney, Agent, or Firm—Elliott N. Kramsky

(57) ABSTRACT

An optical interleaver. The interleaver is based upon the Mach Zender interferometer. At least one of the optical paths joining opposed couplers of the arrangement includes an optical image transfer element intermediate the ends of fibers associated with the couplers. In one embodiment, the optical image transfer element is a single imaging lens whereas, in another embodiment, the element consists of an aligned pair of collimating lenses. During fabrication, optical positioning stages support the optical image transfer element and fiber ends to permit ready adjustment of ΔΘ, the optical path length difference between the arms of the interleaver, to assure predetermined optical channel spacing of an input DWDM signal.

11 Claims, 2 Drawing Sheets

OPTICAL INTERLEAVER WITH IMAGE TRANSFER ELEMENT

BACKGROUND

1. Field of the Invention

The present invention relates to optical interleavers for combining and separating pluralities of optical wavelength channels. More particularly, this invention pertains to a Mach Zender interleaver.

2. Description of the Prior Art

The current and projected growth of the Internet has led to readily foreseeable demands for increased bandwith to service both domestic and foreign consumers and businesses. An accepted method for addressing the bandwidth and cost demands of rapidly-proliferating networks and connections has been the integration of optical elements into such networks.

Optical fiber, due to its relatively high bandwidth and low cost is the preferred means of transmission of voice and data at rates greater than a few tens of megabits per second and over a kilometer or more.

In view of vast increases in projected demand, future network development must take advantage of devices and arrangements that are capable of enhancing traffic many times over without commensurate increases in materials (e.g. optical fiber) and other costs.

Cost per bit per mile (cost of transporting data traffic to a user) is a critical measure of cost effectiveness in communications networks. This may be improved by increasing transmission distance (through the use of such technologies as Raman amplification or amplification based on Erbium-doped fibers) or the number of bits carried (e.g., by employing higher bit rates in a single wavelength in addition to using time division multiplexing.

Another approach to enhancing the cost effectiveness of network designs relies upon the improvement of component performance to increase the number of wavelength channels. The extension of the number of wavelength channels, while maintaining channel spacing, requires the development of new amplifier designs due to the need to increase wavelength range. Further bandwidth enhancement may be obtained through the development of devices compatible with reduced channel spacing.

Reductions in channel spacing place increased performance requirements upon optical filters. Currently, major filtering technologies include thin-film filters, arrayed waveguide gratings and fiber Bragg gratings. Each faces technological challenges in adapting to reduced channel spacings. Thin-film filters, while satisfactory for 400 and 200 GHz dense wavelength division multiplexing (DWDM) systems, are difficult to adapt to channel spacings of 100 and 50 GHz with acceptable yields. A large number of Bragg gratings is required for narrow filter passbands since a single device is required to separate one wavelength. Thus, scaling to a high channel count requires numerous devices. Further, while they are easily coupled to a fiber, expensive circulators are required as they reflect the filtered wavelength to the input fiber.

Arrayed waveguide gratings (AWG), currently commercially available for 40 channels with 100 GHz spacings, can readily separate a spectrum of wavelengths into individual channels. Design and manufacturing tolerances complicate the manufacture of arrayed waveguide gratings as channel spacing decreases. The cost and insertion loss of AWG's with more than 40 channels are extremely high.

The interleaver is a device that combines two input sets of wavelengths in which the channels of one set of wavelengths are offset by one half the channel spacing from those of the other set. Such a device is ideal for ultra dense networks. Further, interleavers can work in reverse to separate a single densely packed channel set into two output fibers, each of twice the channel spacing of the original set. Interleavers may be cascaded to provide further channel separation on four output fibers, each transmitting one fourth of the number of channels and four times the channel spacing. An interleaver or an array of interleavers allows the use of simpler thin-film filters or arrayed waveguide gratings to separate the individual channels.

Various interleaver configurations have been proposed including liquid crystals, birefringent crystals and others. Interleavers based upon a fused-fiber Mach Zender interferometer offer a simple, cost-effective design. However, careful control of the fiber path length difference between the two arms of the interferometer is essential to obtain the correct channel spacing for matching the device to the ITU (International Telecommunications Union) grid.

SUMMARY OF THE INVENTION

The present invention overcomes the foregoing shortcomings of the prior art by providing, in a first aspect, an optical interleaver. Such interleaver includes a first coupler and a second coupler joined to one another by arms of optical fiber. One arm of the interleaver includes an optical image transfer element intermediate the ends of fiber segments from the first and second couplers.

The foregoing and additional features and advantages of this invention will become further apparent from the detailed description that follows. Such description is accompanied by a set of drawing figures. Numerals of the drawing figures, corresponding to those of the written description, point to the features of the invention with like numerals referring to like features throughout both the written description and the drawings.

DETAILED DESCRIPTION OF THE PREFERRED EMBODIMENT

Figure 1:
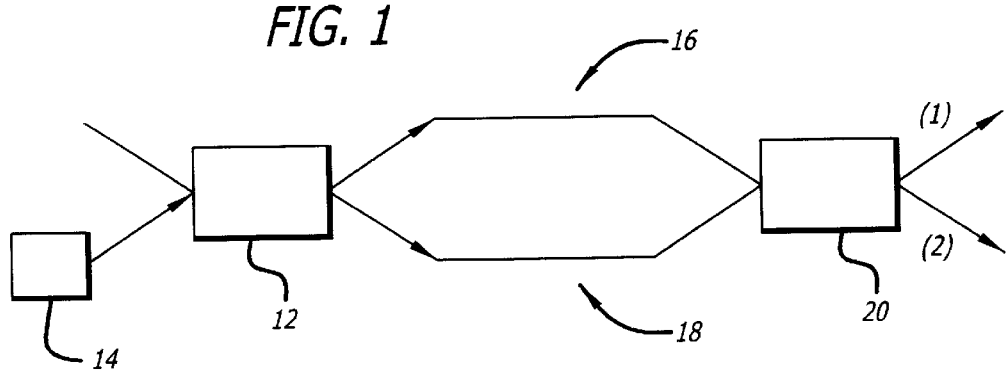
FIG. 1 is a schematic view of an optical interleaver.

FIG. 1 is schematic view of an optical interleaver 10. Such a device operates upon an interferometric principle and the analysis that follows is applicable to a number of two-beam interferometric interleavers including Mach Zender and birefringent plate.

The interleaver 10 comprises a first coupler 12 for splitting light from a light source 14 into two beams. A first optical path 16 may comprise a first arm of the interferometer and a second optical path 18 may comprise a second arm of the interleaver 10. The optical paths 16 and 18 terminate at a second coupler 20. Each of the couplers 12 and 20 are fused biconical couplers made, as is well known in the art, in accordance with biconical tapered fusion technology. They may comprise a pair of optical fibers that have been stripped of their outer jackets and carefully cleaned. The claddings of the glass fibers are held in contact, heated to melting temperature and tension applied to reduce the thickness in the region of contact. At this point, the cores of the fibers (each about 9 microns in diameter) are very closely spaced to thereby achieve optical coupling between the two fiber cores. The resultant device is commonly encapsulated in a quartz tube. Through the phenomenon of evanescent coupling, light traveling through the core of one fiber is coupled into the core of the other fiber resulting in "splitting" of the optical signal. A coupler may act in reverse to combine the light traveling through the two fibers into a single fiber, thus acting as a "combiner". In FIG. 1, the coupler 12 is shown to act as a splitter while the coupler 20 acts as a combiner.

Propagation of light through the different components of the interleaver 10 can be analyzed in a matrix format with each matrix having two columns and two rows in correspondence to each element of the interleaver 10 possessing two inputs and two outputs. The inputs and outputs are complex representations of the optical electric field (monochromatic light assumed).

Frequency Response of Interleaver

The propagation matrices for the (splitter) coupler 12, the optical paths 16, 18 and the (combiner) coupler 20 are as follows:

$$\begin{bmatrix} \sqrt{\alpha} & \sqrt{1-\alpha} \cdot e^{i\frac{\pi}{2}} \\ \sqrt{1-\alpha} \cdot e^{i\frac{\pi}{2}} & \sqrt{\alpha} \end{bmatrix} \quad (1)$$

$$\begin{bmatrix} e^{i\phi1-\delta1} & 0 \\ 0 & e^{i\phi2-\delta2} \end{bmatrix} \begin{bmatrix} \sqrt{\beta} & \sqrt{1-\beta} \cdot e^{i\frac{\pi}{2}} \\ \sqrt{1-\beta} \cdot e^{i\frac{\pi}{2}} & \sqrt{\beta} \end{bmatrix}$$

Where:

$\alpha$, $\beta$ are the power splitting ratios of the couplers 12 and 20 respectively;

$\Phi 1$, $\Phi 2$ are the phase shifts through the optical paths 16 and 18 respectively; and $\delta 1$, $\delta 2$ are the amplitude loss coefficients of optical paths 16 and 18 respectively.

The matrix MI for the interleaver 10 is the product of the three matrices, namely $$MI := \begin{bmatrix} \sqrt{\alpha \cdot \beta} \cdot e^{i\phi1-\delta1} - \sqrt{(1-\alpha)\cdot(1-\beta)} \cdot e^{i\phi2-\delta2} & \sqrt{\beta\cdot(1-\alpha)} \cdot e^{i(\frac{\pi}{2}+\phi1)-\delta1} + \sqrt{\alpha\cdot(1-\beta)} \cdot e^{i(\frac{\pi}{2}+\phi2)-\delta2} \\ \sqrt{\alpha\cdot(1-\beta)} \cdot e^{i(\frac{\pi}{2}+\phi1)-\delta1} + \sqrt{\beta\cdot(1-\alpha)} \cdot e^{i(\frac{\pi}{2}+\phi2)-\delta2} & \sqrt{\alpha\cdot\beta} \cdot e^{i\phi2-\delta2} - \sqrt{(1-\alpha)\cdot(1-\beta)} \cdot e^{i\phi1-\delta1} \end{bmatrix} \quad (2)$$

The complex output electric fields EO1, EO2 are derived from the input electric fields EI1, EI2 using $$\begin{bmatrix} EO1 \\ EO2 \end{bmatrix} := MI \cdot \begin{bmatrix} EI1 \\ EI2 \end{bmatrix} \quad (3)$$

An ideal interleaver has power splitting rations of 0.5 for both of the couplers 12, 20 ($\alpha$, $\beta=\frac{1}{2}$) with small and equal losses for both of the optical paths 16, 18 ($\delta 1=\delta 2=\delta<<1$). The matrix for the ideal interleaver is (substituting i=exp(i $\pi/2$)

$$MI := \frac{1}{2} \cdot e^{-\delta} \cdot \begin{bmatrix} e^{i\phi1} - e^{i\phi2} & i\cdot(e^{i\phi1} + e^{i\phi2}) \\ i\cdot(e^{i\phi1} + e^{i\phi2}) & e^{i\phi2} - e^{i\phi1} \end{bmatrix} \quad (4)$$

Optical Interleaver as Splitter of a Multi-Wavelength Signal

Considering first the ideal interleaver, using equations 2 and 3 and setting EI1=EI (a real number) and EI2=0, the optic electric field outputs are $$EO1 := \frac{1}{2} \cdot e^{-\delta} \cdot (e^{i\phi1} - e^{i\phi2}) \cdot EI \quad (5)$$

$$EO2 := \frac{1}{2} \cdot e^{-\delta} \cdot i \cdot (e^{i\phi1} + e^{i\phi2}) \cdot EI$$

The optical power at output port 1 is $$([EO1])^2 = \frac{e^{-2\delta}}{4} \cdot [1 + 1 - e^{i(\phi1-\phi2)} - e^{-i(\phi1-\phi2)}] \text{ or} \quad (6)$$

$$P1 = e^{-2\delta} \frac{1-\cos(\Delta\phi)}{2}$$

The optical power at output port 2 is $$([EO2])^2 = \frac{e^{-2\delta}\cdot(1)}{4} \cdot [1 + 1 + e^{i(\phi1-\phi2)} + e^{-i(\phi1-\phi2)}] \text{ or} \quad (7)$$

$$P2 = e^{-2\delta} \frac{1+\cos(\Delta\phi)}{2}$$

For a non-ideal interleaver, the equations for the output powers are (from P1=|EO1|$^2$ and P2=|EO2|$^2$) as follows:

$$P1 := \alpha\cdot\beta\cdot e^{-\delta1} + (1-\alpha)\cdot(1-\beta)\cdot e^{-\delta2} - \quad (8)$$
$$2\cdot\sqrt{\alpha\cdot\beta\cdot(1-\alpha)\cdot(1-\beta)} \cdot e^{-(\delta1+\delta2)} \cdot \cos(\Delta\phi)$$

$$P2 := \alpha\cdot(1-\beta)\cdot e^{-\delta1} + \beta\cdot(1-\alpha)\cdot e^{-\delta2} +$$
$$2\cdot\sqrt{\alpha\cdot\beta\cdot(1-\alpha)\cdot(1-\beta)} \cdot e^{-(\delta1+\delta2)} \cdot \cos(\Delta\phi)$$

Figure 2:
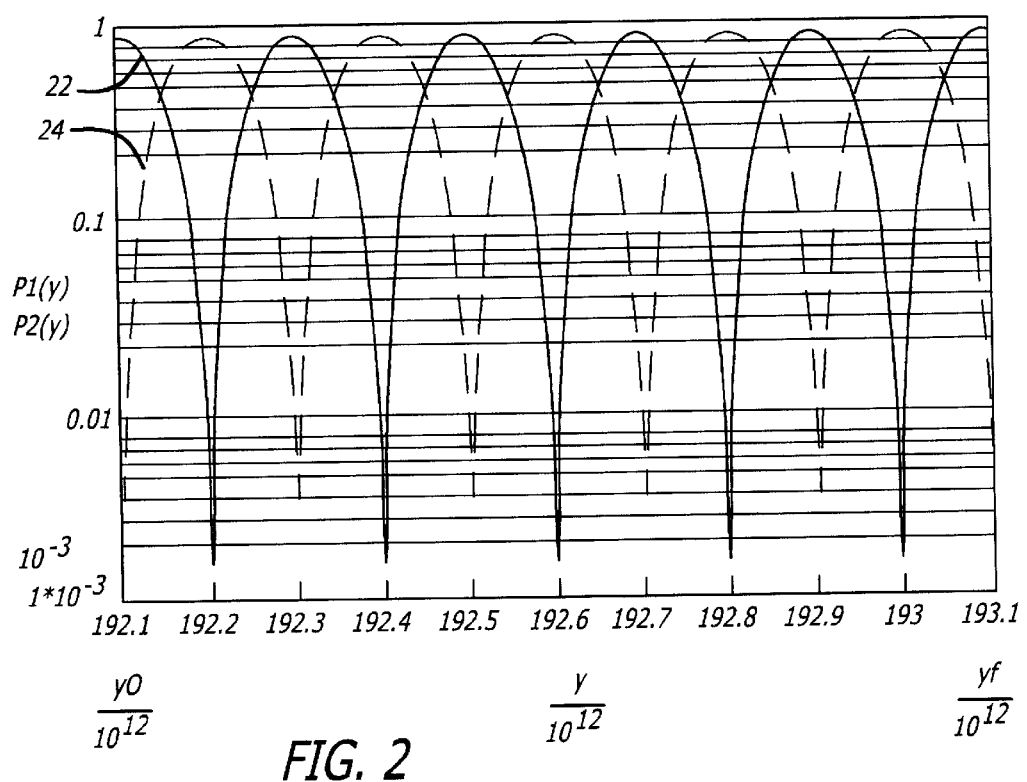
FIG. 2 is a graph (logarithmic vertical scale) of normalized output power as a function of optical frequency for an interleaver based upon the Mach Zender interferometer.

FIG. 2 is a plot of the interleaver's frequency response, namely the normalized output power versus optical frequency (in THz) as defined by the preceding equations for an interferometer based upon the principle of the Mach-Zender interferometer having the following parameters: $\alpha=0.51$, $\beta=0.49$ (power splitting ratios); L1=0.25 dB, L2=1.0 dB (optical power loss of paths 16, 18 in dB, related to amplitude loss coefficient $\delta$ by $e^{-2\delta}=10^{-L/10}$); optical path length difference=1.5 mm. The optical path length difference $\Delta\theta$ is related to optical phase shift difference $\Delta\Phi$ by $$\Delta\Phi = 2\pi\nu\Delta\theta/c \quad (9)$$

Where c is the speed of light in a vacuum.

The logarithmic plot of FIG. 2 with the output taken at "1" of FIG. 1 indicated by the succession of maxima and minima of the curve denoted 22 and the output taken at "2" of FIG. 1 indicated by the succession of maxima and minima of the curve denoted 24 illustrates a frequency spacing between two peaks of a given output of 0.2 THz (200 GHz) with the signals at the two outputs shifted with respect to one another by 0.1 THz (100 GHz). Since a non-zero loss is assumed, the peak amplitudes at the two outputs do not equal 1.0.

The operation of an interleaver as a multi-channel signal splitter can be understood from FIG. 2. Assuming that the input is a series of mutually incoherent wave channels whose frequency bands do not overlap and that are separated by 100 GHz, the interleaver 10 separates adjacent channels as follows: "odd" frequency channels are forwarded to the output 1 of FIG. 1 as constructive interference occurs at this output for such frequencies while "even" frequency channels are forwarded to output 2 as constructive interference for even channels occurs at output 2.

Relationship Between Optical Signal and Path Length Difference

The optical path length difference established between the optical fiber arms 16 and 18 is the primary determinant of the frequency spacing of the interleaver. Since such spacing must satisfy a telecommunications industry standard, such as the one established by the ITU grid, a condition is established upon the optical path length difference between the arms 16 and 18. (It should be noted that, while the interleaver 10 is based upon the "generic" Mach-Zender interferometer configuration, a main difference between them is that, in a generic interferometer, the optical path length difference is generally on the order of one wavelength, while that of the interleaver 10 is typically in the hundreds of wavelengths.)

Assume that the input to the interleaver 10 comprises a DWDM signal consisting of a train of mutually incoherent optical signals (wavelength channels) of central frequencies $v_1, v_2, v_3 \ldots v_M$ where M is the number of channels and $\Delta v$ the frequency spacing between adjacent channels. Referring back to Equations 6 through 8, constructive interference at output 2 occurs when the phase difference $\Delta\Phi$ is a multiple of $2\pi$ since $\cos(2N\pi)=+1$. It follows that, for any particular frequency $v_i$, the following applies $$\Delta\Phi_i = 2\pi v_i \Delta\theta/c = 2N\pi \qquad (10)$$

where N is a positive integer that represents the difference between the sizes of the optical paths 16 and 18 in terms of the number of wavelengths that can "fit" within each.

For the interleaver 10 to function, destructive interference must occur for the adjacent optical frequency $v_{i+1}$. It follows that $\Delta\Phi_{i+1}$ must be an odd multiple of $\pi$ so that $\cos((2N+1)\pi)=-1$ and the following must also be satisfied $$\Delta\Phi_{i+1} = 2\pi v_{i+1} \Delta\theta/c = (2N+1)\pi \qquad (11)$$

Equations 10 and 11 imply that the signal at frequency $v_{i+2}$ will see constructive interference and the signal at $v_{i+3}$ will see destructive interference at output 2. Generally, all signals of frequency $v_{i+k}$ experience constructive interference (maximum intensity) if k is even and destructive interference (minimum intensity) if k is odd. The situation is exactly reversed in regard to the signal appearing at the output 1. Thus, the signals at the outputs 1 and 2 are complementary and the net outcome is that the interleaver 10 splits the input DWDM signal channels, sending the even channels to the output 2 and the odd channels to the output 1.

By subtracting equation 10 from equation 11, the relationship between the optical path length difference and frequency spacing between adjacent input channels, $\Delta v = v_{i+1} - v_i$ can be shown to be $$\Delta\theta = c/(2\Delta v) \qquad (12)$$

The plot of interleaver 10 response of FIG. 2 assumes a $\Delta\theta$ of 1.5 mm so that the frequency spacing between adjacent channels at the input is 100 GHz. Since the plot corresponds to interleaver outputs, the frequency spacing between adjacent channels of the same output (port 1 or 2) is 200 GHz.

Thus, it can be seen that $\Delta\theta$ is a very critical factor in the design and fabrication of an all-fiber optical interleaver 10. Unfortunately, while it is possible to determine this important parameter analytically with great precision, the manufacture of such a device represents a significant challenge.

Splicing two couplers together to form the interleaver 10 poses numerous difficulties. First, the splicing together of segments of fiber associated with the couplers 12 and 20 suffers from inherent problems of splices, some of which make an interleaver formed of spliced arms impractical for production. Attainment of good splices requires extreme care in residue and dirt removal after jacket stripping. In addition, each splice requires the careful precision cleaving of two fiber ends to optical quality flatness. Imperfections in forming a splice lead to high insertion loss and consequent suboptimal functioning of the device. The main shortcoming of this technique is that, if a fusion splice in one of the two arms of the interleaver has to be redone, a corresponding change, requiring another new splice, must be made in the other arm to maintain the $\Delta\theta$ required to achieve the desired channel spacing.

The present invention addresses the above problems by providing an optical interleaver based upon the Mach Zender interferometer with precise channel spacing that is free of the above-mentioned splice-related problems in at least one of the interleaver's arms.

Figure 3:
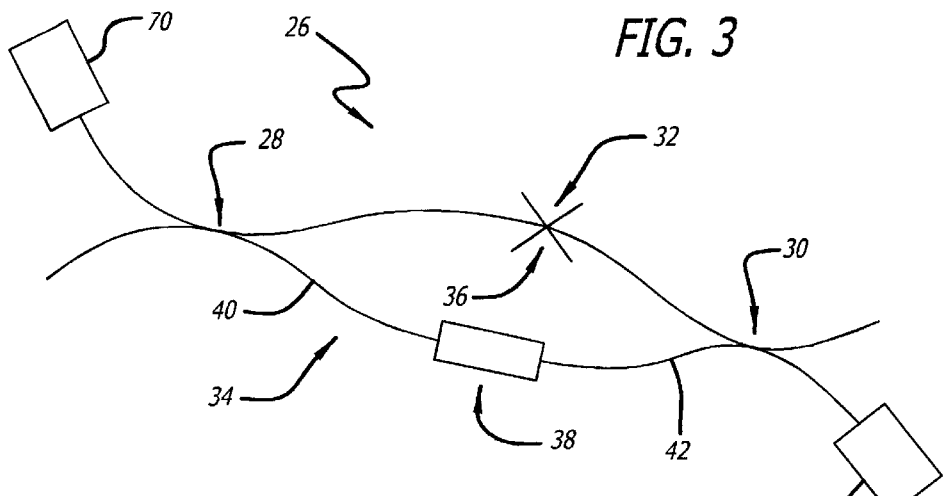
FIG. 3 is a schematic view of an optical interleaver in accordance with the invention.

FIG. 3 is a schematic view of an optical interleaver 26 in accordance with the invention. The device generally comprises a first coupler 28, a second coupler 30 and a pair of optical paths 32, 34 therebetween, each of which includes segments of optical fibers that form the couplers 28 and 30.

As can be seen the optical path 32 may include a splice 36 for joining the ends of segments of optical fiber of the couplers 28 and 30. Alternatively, the two couplers 28 and 30 could have been formed of a common optical fiber making the splice unnecessary.

An optical image transfer element 38 is mounted within the optical path 34. The element 38 is provided in lieu of a splice between the ends of optical fiber segments 40 and 42 of the optical path 34. It will be seen that the element functions to facilitate proper setting of the difference, $\Delta\theta$, between the optical paths 32 and 34 without introduction of a splice into the path 34. As a result, the above-described shortcomings of interleavers formed by the splicing together of segments of fibers forming the opposed couplers are either minimized or avoided altogether.

Figure 4A:
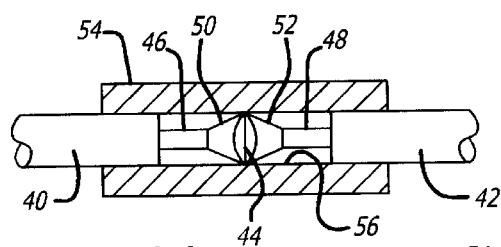
FIGS. 4(a) and 4(b) are schematic views of an optical interleaver in accordance with two alternative embodiments of the invention.

FIG. 4(a) is a cross-sectional view in elevation of a first alternative embodiment of the invention. As shown, a miniature imaging lens 44 is aligned between the optical fiber segments 40 and 42. The lens 44 is held in contact with the glass ends 46 and 48 of the fibers 40 and 42 (from which the outer jackets have been stripped) at its opposed surfaces by optical quality adhesive 50, 52. Alternatively, the lens 44 is not in contact with the fiber ends 46 and 48. The proper positioning of the lens 44 with respect to fiber ends 46 and 48 will depend upon the imaging properties of the lens 44 (e.g., focal length). The miniature lens 44 may be convex, concave or spherical. In the event that a convex or concave lens is employed, a diameter on the order of 3 mm is typical while microspherical lenses are commercially available of approximately 0.5 mm diameter.

The arrangement of the foregoing embodiment is fixed within an encapsulating outer tube 54 having an interior longitudinal channel 56. The tube may be of metal, molded plastic or other synthetic composition, but preferably made of a stiff material with very low coefficient of thermal expansion such as INVAR (a metal).

Figure 4B:
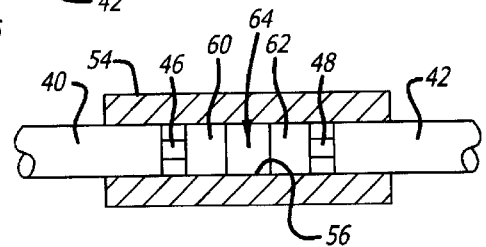

FIG. 4(b) is a side elevation view in cross-section of a second embodiment of the invention. As in the prior embodiment, the optical image transferring element is encapsulated within an interior longitudinal channel 56 of a tube 54. The element comprises a pair of collimating lenses, 60 and 62, attached to the stripped ends 46 and 48 of the fibers 40 and 42 respectively. Each lens 60, 62 is fixed to the end of the respective fiber by means of optical quality adhesive. This combination of a collimating lens plus optical fiber is well-known in the art as a "fiber optic collimator". The collimating lens may be of the type generically known as a graded-index or "GRIN" lens. A void space 64 is interposed between the two collimating lenses 60, 62 within the longitudinal channel 56. The void space is adjusted to achieve the desired frequency spacing as explained below.

Figure 5A:
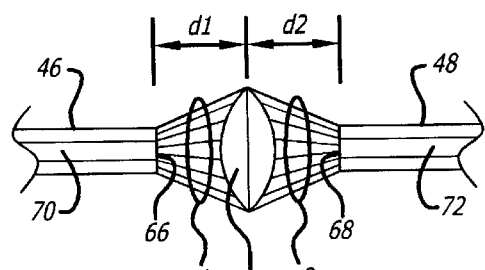
FIGS. 5(a) and 5(b) are schematic views for illustrating the operation of the invention in accordance with the embodiments of FIGS. 4(a) and 4(b) respectively.
Figure 5B:
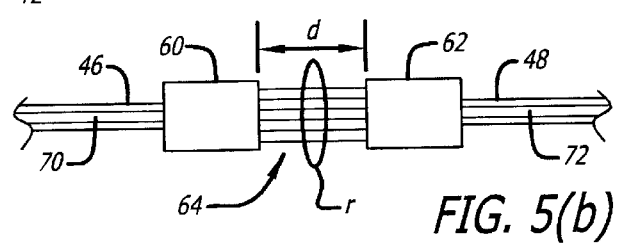

FIGS. 5(a) and 5(b) are schematic views for illustrating the operation of the invention in accordance with the embodiments of FIGS. 4(a) and 4(b) respectively. Referring first to FIG. 5(a), light radiating from the cleaved or polished end 66 of the glass fiber 46 is represented by the bundle of dispersing light rays $r_1$ while that entering the cleaved or polished end 68 of the glass fiber 48 is represented by the bundle of converging light rays $r_2$. (It is well known that, in traveling through the fibers 46 and 48, light is essentially confined to the fiber cores 70 and 72 respectively.) The numerical aperture of the lens 44 is sufficient to capture essentially all of the light emergent from the fiber 46 and to refocus it into the fiber 48. That is, lens 44 "images" the core end face 66 of fiber end 46 into the core end face 68 of fiber end 48. (For the purposes of this explanation, it is assumed that the light is traveling from the fiber 46 to the fiber 48.) The lens 44 is separated from the ends 66 and 68 by equal distances $d_1$ and $d_2$ respectively ($d_1=d_2$). This must be kept in mind when setting the two distances (prior to cementing with optical quality adhesive) to obtain a desired value of $\Delta\theta$ to obtain a predetermined optical channel spacing.

The device of FIG. 4(a) is fabricated by setting the combination of the fibers 46 and 48 and the lens 44 on standard X-Y-Z and angular precision micro positioning stages such as that manufactured by Newport Corporation or Melles Griot and which are well-known in the art. The choice of lens 44 is somewhat constrained by numerical aperture and focal length although, as described above, it may be of convex, concave or spherical configuration. Unlike a splice, the length of the optical path 34 may be set and then re-set to establish $\Delta\theta$ without a fusion step that might require a corresponding re-splicing of the optical path 32. The correct $\Delta\theta$ may be determined analytically as described above, then set with great precision by adjustment of the positioning stages. Alternatively, or in addition, it may be fine tuned by inputting a DWDM signal from a source 76 and observing it at an optical spectrometer 78 while adjusting the positioning stages or by employing a tunable wavelength source and an optical spectrum analyzer. Once the correct value of $\Delta\theta$ has been established by moving the ends 66 and 68 together or apart (while maintaining $d_1=d_2$), optical quality adhesive 50, 52 is applied to secure the relative positions of the fibers 46, 48 and the lens 44 and the assembly inserted into the channel 56 of the tube 54.

The operation of the embodiment of FIG. 4(b) is illustrated with reference to FIG. 5(b). The collimating lenses 60 and 62 are separated a distance d by the void 64. Due to the nature of the collimating lenses 60 and 62, the rays r are parallel and adjustment of the distance d is relatively straightforward. That is, with the aid of standard positioning stages (e.g. Newport or Melles Griot stages as referenced above), one of the collimating lenses 60 or 62 may be moved toward or away from the other to adjust d until either an analytically-determined $\Delta\theta$ is satisfied or such distance is fine tuned by observing a DWDM output at the spectrum analyzer 72. As in the case of the prior embodiment, the invention provides a means for obtaining a predetermined optical channel spacing without the insertion loss and fabrication difficulties associated with splicing.

Thus it is seen that the present invention provides an optical interleaver based upon the Mach Zender interferometer that minimizes the problems associated with optical splicing, including insertion loss and structural difficulties that make such a device unsuitable for production applications. By utilizing the teachings of this invention one obtains a device that is easily and precisely set for a predetermined optical channel spacing.

While this invention has been described with reference to its presently preferred embodiment, it is not limited thereto. Rather, this invention is limited only insofar as it is defined by the following set of patent claims and includes within its scope all equivalents thereof.

What is claimed is:

1. An optical interleaver comprising, in combination:
    a) a first coupler comprising a pair of optical fibers;
    b) a second coupler comprising a pair of optical fibers;
    c) said couplers being joined to one another by optical paths comprising said optical fibers; and
    d) at least one of said optical paths including an optical image transfer element comprising at least one optical lens separate from said optical fibers and intermediate ends of fibers of said optical path.

2. An optical interleaver as defined in claim 1 wherein said lens is an imaging lens.

3. An optical interleaver as defined in claim 2 wherein the ends of said fibers are equal distances from said imaging lens.

4. An optical interleaver as defined in claim 3 wherein said ends of said fibers are each fixed to said distance from said imaging lens by optical adhesive.

5. An optical interleaver as defined in claim 1 further including:
    a) said interleaver being arranged to provide a predetermined optical channel spacing, $\Delta v$; and
    b) the difference between the two optical paths of said interleaver, $\Delta\theta$, is related to said predetermined optical channel spacing $\Delta v$ by $$\Delta\theta = c/(2\Delta v)$$

where c is the speed of light.

6. An optical interleaver as defined in claim 4 further including:
    a) an elongated tube;
    b) said tube having an internal longitudinal channel; and
    c) said lens and said fibers being aligned within said internal channel.

7. An optical interleaver as defined in claim 1 wherein said optical image transfer element comprises at least one collimating lens.

8. An optical interleaver as defined in claim 7 further including:
    a) said optical image transfer element comprises two collimating lenses; and b) each of said collimating lenses being fixed to an end of an optical fiber of said optical path.

9. An optical interleaver as defined in claim 8 further including:
   a) each of said collimating lenses having a front surface and a rear surface;
   b) said ends of said fibers being fixed to the rear surfaces of said collimating lenses;
   c) said collimating lenses being mutually aligned so that their front surfaces face one another; and
   d) a separation distance existing between the front surfaces of said collimating lenses.

10. An optical interleaver as defined in claim 9 further including:
    a) said interleaver being arranged to provide a predetermined optical channel spacing, $\Delta v$; and
    b) the difference between the two optical paths of said interleaver, $\Delta\theta$, is related to said predetermined optical channel spacing $\Delta v$ by $$\Delta\theta = c/(2\Delta v)$$

where c is the speed of light.

11. An optical interleaver as defined in claim 9 further including:
    a) an elongated tube;
    b) said tube having an internal longitudinal channel; and
    c) said collimating lenses and said fibers being aligned within said internal channel.

* * * * *